(12) United States Patent
Wong

(10) Patent No.: US 9,224,505 B2
(45) Date of Patent: Dec. 29, 2015

(54) ROTATING HIGH DENSITY FUSION REACTOR FOR ANEUTRONIC AND NEUTRONIC FUSION

(71) Applicant: Alfred Y. Wong, Los Angeles, CA (US)

(72) Inventor: Alfred Y. Wong, Los Angeles, CA (US)

(73) Assignee: Nonlinear Ion Dynamics, LLC, Monterey, CA (US)

( * ) Notice: Subject to any disclaimer, the term of this patent is extended or adjusted under 35 U.S.C. 154(b) by 305 days.

(21) Appl. No.: 13/952,826

(22) Filed: Jul. 29, 2013

(65) Prior Publication Data

US 2013/0315360 A1 Nov. 28, 2013

Related U.S. Application Data

(60) Division of application No. 12/850,633, filed on Aug. 5, 2010, now abandoned, which is a continuation-in-part of application No. 12/783,550, filed on May 19, 2010, now Pat. No. 8,298,318.

(60) Provisional application No. 61/179,625, filed on May 19, 2009.

(51) Int. Cl.
  *H05H 1/22* (2006.01)
  *G21B 1/05* (2006.01)

(52) U.S. Cl.
  CPC *G21B 1/05* (2013.01); *Y02E 30/126* (2013.01)

(58) Field of Classification Search
  CPC ... G21B 1/00; G21B 1/05–1/057; G21B 1/11; G21B 1/17; G21B 1/21; G21B 3/006; Y02E 30/00–30/18
  USPC ......... 376/100, 121, 123, 124, 130, 142–144, 376/150–152
  See application file for complete search history.

(56) References Cited

U.S. PATENT DOCUMENTS

| | | | | |
|---|---|---|---|---|
| 3,014,857 | A * | 12/1961 | Gow et al. | 376/130 |
| 6,654,433 | B1 * | 11/2003 | Boscoli | 376/108 |
| 6,891,911 | B2 * | 5/2005 | Rostoker et al. | 376/128 |
| 2003/0223528 | A1 * | 12/2003 | Miley et al. | 376/113 |

* cited by examiner

*Primary Examiner* — Jack W Keith
*Assistant Examiner* — Marshall O'Connor
(74) *Attorney, Agent, or Firm* — Vorys, Sater, Seymour and Pease LLP; Vincent M DeLuca

(57) ABSTRACT

A fusion device produces fusion of neutral atoms and ions in an "aneutronic fusion" manner without neutrons as products utilizes strong ion-neutral coupling at high neutral densities. Ions and neutrals rotate together in a cylindrical chamber due to frequent collisions. High magnetic forces make the attainment of high rotation energy possible; the magnetic field in a medium can be set at very high values because of the absence of magnetic charges. The repeated acceleration by strong magnetic forces in the azimuthal direction makes possible very high ion velocity. Fusion takes place mainly between neutral particles. This approach can be applied to fusion with neutrons as well. Conventional fusion schemes and neutron sources can be realized using the principles described above in the generation of neutrals of high energies and densities.

7 Claims, 6 Drawing Sheets

One configuration of a p-$B^{11}$ fusion device with concentric electrodes

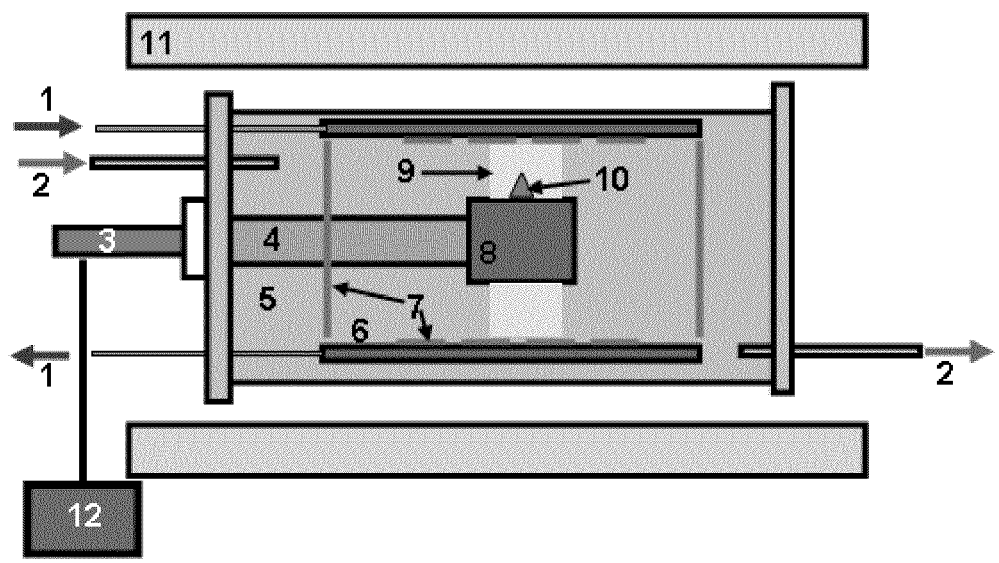
Fig. 1 One configuration of a p-B$^{11}$ fusion device with concentric electrodes

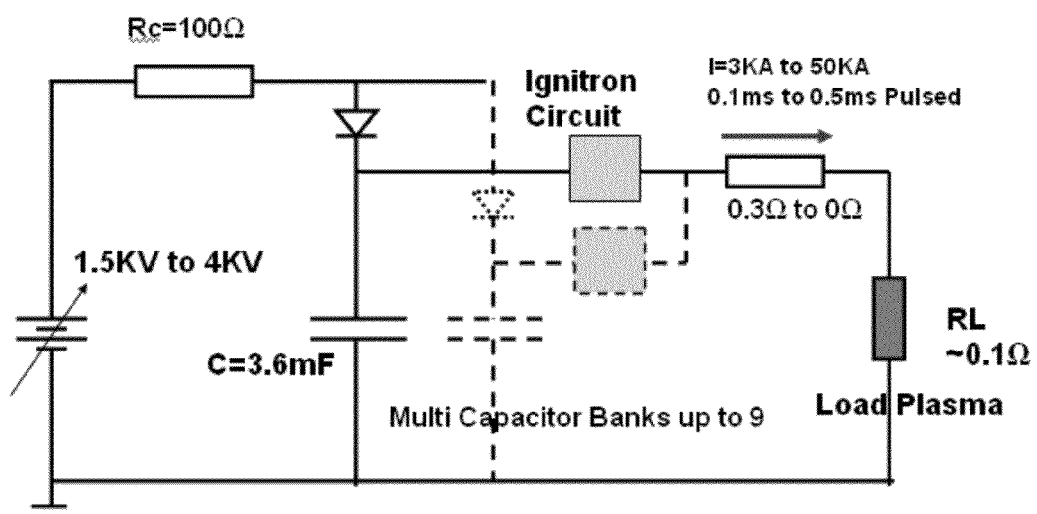
Fig. 2 High Current Multi-Triggering Discharge Circuit to extend pulse duration

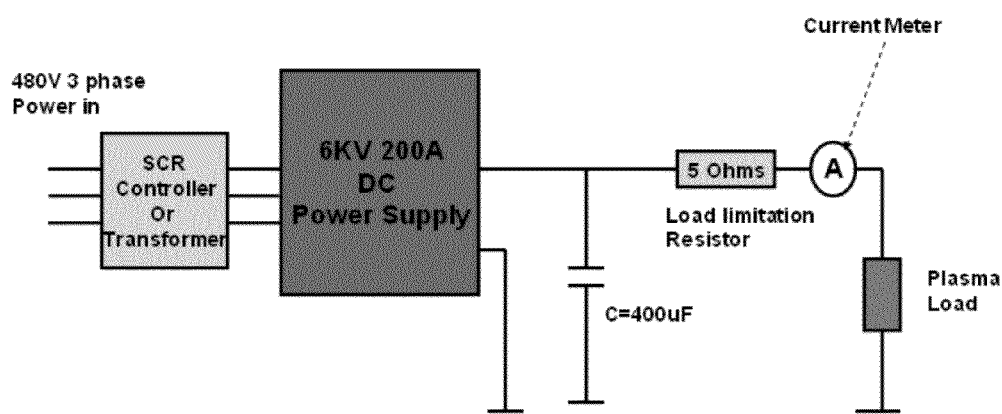
Fig 3.  6KV DC power supply for CW Discharge

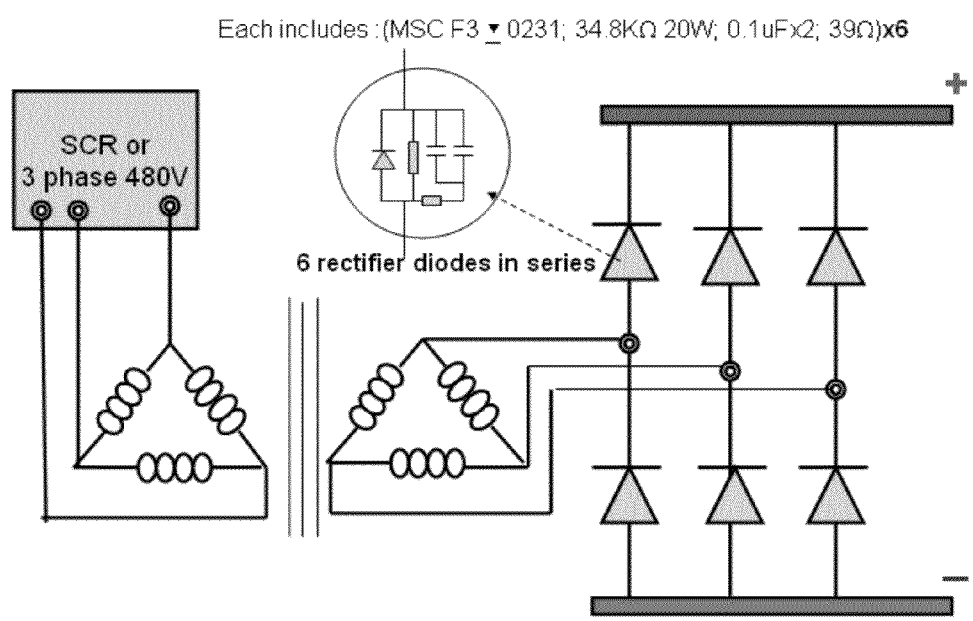
Fig 4  6KV 200A DC Power Supply Circuit

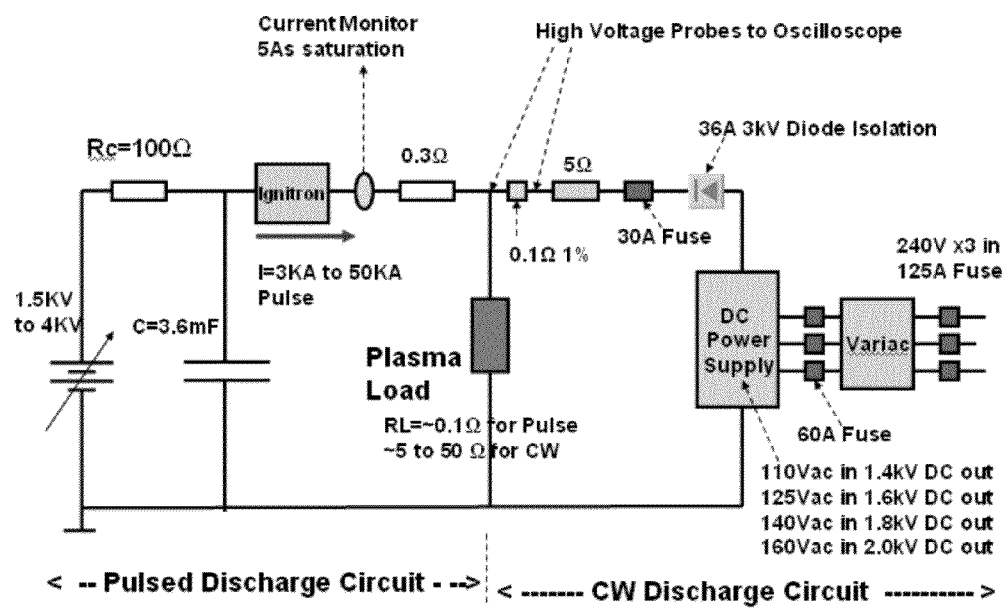
Fig. 5 Pulsed and CW Combination Discharge Circuit

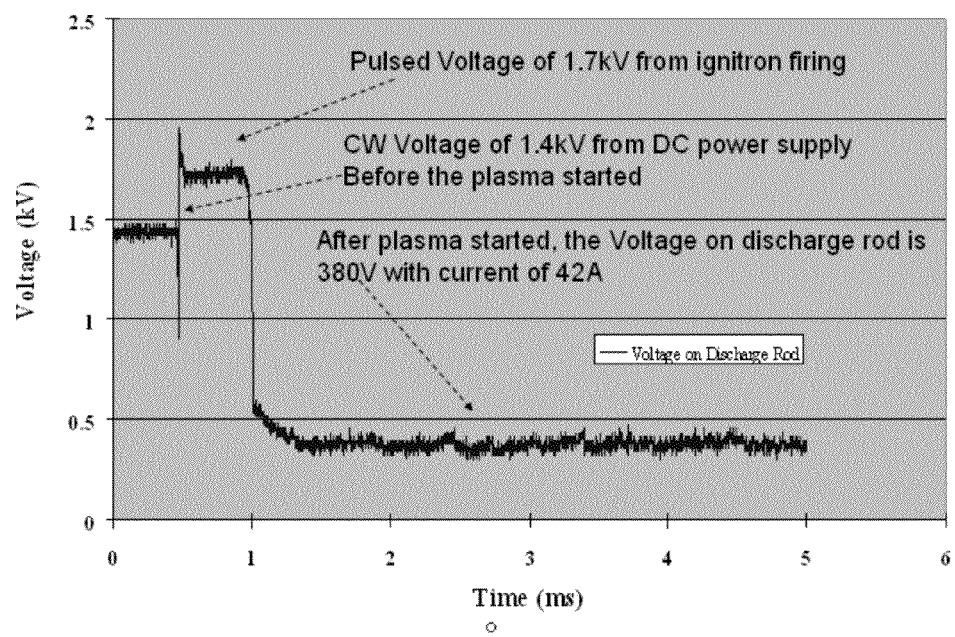
Fig.6 Typical plasma discharge monitored on the central rod using combination supply from fig 5.

ROTATING HIGH DENSITY FUSION REACTOR FOR ANEUTRONIC AND NEUTRONIC FUSION

CROSS-REFERENCE TO RELATED APPLICATIONS AND CLAIM FOR PRIORITY

This application is a division of copending application Ser. No. 12/850,633 filed Aug. 5, 2010, which is a continuation-in-part of copending application Ser. No. 12/783,550 filed on May 19, 2010, which claims priority under 35 U.S.C. §119(e) from provisional application Ser. No. 61/179,625 filed on May 19, 2009, the entire contents of which are incorporated herein by reference in their entirety.

BACKGROUND OF THE INVENTION

1. Field Of The Invention

This invention describes an energy technology which utilizes neutrals to undergo fusion. It relates to the field of energy production from nuclear fusion in which two atoms fuse together into a third atom with the resultant release of energy, a consequence of mass being converted into energy.

This invention provides a new approach to the production of fusion energy using neutrals instead of charged particles. It describes how neutrals can be accelerated in a compact rotating configuration, thereby achieving repeated interactions among themselves.

2. Background

Fusion research has been going on since 1950's and the prospect for a commercial reactor is still many years away. The confinement of charged particles, the presence of instabilities and the large amount of energy required to sustain the reacting system at high temperatures all make this into one of the most challenging world-wide efforts. Many configurations have been proposed and tried to confine charged particles which are accelerated by electromagnetic means. No simple low-cost reactors have been realized today.

The present invention chooses to pursue fusion among neutrals in order to achieve very high density of particles for interactions, e.g. four orders of magnitude higher than is possible with charged particles. It uses the strong magnetic force (several thousands of newtons) on a current element to drive neutrals through the principle of ion-neutral coupling. The simple geometry and the compactness of the device makes it a breakthrough in the concept on fusion. Unlike charged particles, neutrals do not experience Coulomb repulsion as they approach each other. The cross sections of interactions are therefore higher.

The high density of neutrals makes it possible to produce energy at a significant rate for commercial application. The rate of fusion is proportional to the square of the density. This technology is different from the present day usage of charged particles for fusion, where it is difficult to achieve high density due to the energy requirement on ionization and instabilities of a charged medium.

The high density of interacting particles makes it possible to attempt clean fusion where neutrons are not in the products. The advantages of such a fusion reactor are numerous, one of which is the sitting of reactors in urban areas. Others are environmental considerations including low amount of nuclear wastes, low cost of fuels and the replacement of hydrocarbons as fuels, thereby eliminating the emission of greenhouse gases.

SUMMARY OF THE INVENTION

This device operates at high neutral densities in order to increase the rate of fusion reactions even for low cross sections of interacting elements. This rate is proportional to the square of neutral densities. In one embodiment these neutrals are driven to high velocities by a non-mechanical plasma rotor in an annular region bounded by two concentric electrodes in an axial magnetic field. A DC voltage is imposed between these electrodes to impart a radial DC current I which produces a force $\underline{F}=I\,\underline{L}\times\underline{B}$ in the azimuthal direction where $\underline{L}$ is the radial vector of length L along which the current flows.

The repeated interactions between hydrogen and boron atoms in the annular region produce sufficient fusion reactions to yield energetic helium nuclei which can be used in a direct conversion to electricity or a source of heat for energy production. The low % ionization, the high driving force F in thousands of newtons and the repeated interactions at high neutral densities combine to make this a system without pollution and minimal radioactive wastes. Hydrogen and boron are both plentiful and non-radioactive stable elements. The fusion product, energetic doubly-charged helium nuclei, lend themselves to direct conversion to electricity with high efficiency.

This device requires only a simple capital outlay consisting of a superconducting magnet and a DC power supply. It can operate in various sizes from 50 cm size to 10's meters, depending on the application.

Another aneutronic reactor uses the proton lithium (p-$Li^6$) reactions with products of $He^3$ and $He^4$. The ease of coating of Li on electrodes inside chamber might be an advantage of sources and sinks in certain applications.

The above technology of using a predominant amount of neutrals can also be applied to D-T, D-D fusion where the products include neutrons. The capital investment and operation cost will be higher because of requirements for shielding and handling of radioactive materials. However the larger cross sections at lower energies of these fusion reactions compensate somewhat for this higher capitalization and operational cost.

BRIEF DESCRIPTION OF THE DRAWINGS

FIG. 1 shows one configuration of a p-$B^{11}$ fusion device with concentric electrodes.

FIG. 2 shows a high current multi-triggering discharge circuit to extend pulse duration FIG. 3 shows a 6 kilovolt direct current power supply for continuous wave discharge.

FIG. 4 shows a 6 kilovolt 200 amp direct current power supply circuit.

FIG. 5 shows a pulsed and continuous wave combination discharge circuit.

FIG. 6 shows a typical plasma discharge monitored on the central rod using the combination supply from FIG. 5.

DETAILED DESCRIPTION OF THE INVENTION

Typical designs of pulse supplies and CW supplies used to produce pre-ionization and sustained rotation of the plasma are illustrated in FIG. 2-4.

FIG. 1 shows a configuration of a p-B11 fusion device with concentric electrodes. A superconducting magnet 11 is provided capable of generating an axial magnetic field. The chamber 5 has a cooling input 1. The chamber 5 also has a gas input 2. An electrical power supply 12 is connected to discharge rod 3. An expanded discharge rod 8 is provided in chamber 5. Element 4 is an insulator. Element 6 is an external discharge rod. Element 7 denotes Boron discs. Element 10 illustrates a Boron target. Element 9 illustrates a plasma.

Multiple pulse supplies are triggered sequentially to produce a sequence of pulses for sustaining a high rotation rate. The timing of the pulses is such that before the conductivity of the plasma decays to a low value the next pulse is turned on to impart another radial current for rotation.

After the initial breakdown to create the plasma current the voltage required to maintain the flow is lowered such as shown in FIG. 6, thereby lowering the power requirement. In this scheme only a low % ionization ($10^{-5}$) is required. The recombination rate between ions and electrons is minimum because of ions and electrons are surrounded by neutrals. The power to maintain such low % ionization is many times less than what is needed to maintain a fully ionized medium.

The rotations of neutrals and ions are diagnosed using a camera with fast shutter speeds up to 100,000/s. By following a given inhomogeneity the rotation rate can be estimated. Another method is to use "laser tagging". A laser is tuned to a given wavelength which matches either an ion line or a neutral line. The resonant scattering at a different wavelength is monitored in space and time using the fast camera with a filter. Alternately a spectrometer and a fiber tuned to a given wavelength can also be used.

Each element has both rotating and stationary distributions such that the rotating boron species collides with the stationary hydrogen species and vice versa. The stationary component of $B^{11}$ is provided at the inner and outer electrodes, while the rotating component $B^{11}$ is provided by J×B force. A continuous stream of hydrogen is fed from a pressure tank to produce background pressures of 1-10 Torr. The repeated interactions between these rotating boron and stationary hydrogen and rotating hydrogen and stationary boron give rise to a high rate of fusion as represented in the following equation:

$$dW/dt = n_p n_b \sigma v Y \text{ rate of fusion/cm}^3 \text{ sec}$$

where $n_p$, $n_b$ are the densities of protons and borons respectively;
$\sigma$ is the fusion cross section at a particular energy E
v is the relative velocity between proton and boron,
Y is the energy yield per fusion reaction=8.7 MeV
It should be noted that $n_p$ represents both hydrogen ions and neutrals because for fusion reactions either neutrals or ions can participate in fusion.

The fusion break-even condition is given by the fusion output being greater than the energy input per unit volume:

$$dW/dt > V_{in} I_{in}/V \text{ where}$$

$V_{in}$=Voltage applied between two concentric electrodes
$I_{in}$=Radial current due to the applied voltage $V_{in}$
V=Volume of rotating region where neutrals and ions are being driven by J×B force; energy input comes from the DC voltage and current applied between the two electrodes.

The operating magnetic field is usually between 0.5-3 T. Initial ionization by electrons along the axial magnetic field might be used to provide electrons and ions for pre-ionization. The plasma impedance between the two concentric cylinders is lowered such that a radial current flows between the concentric cylinders. This radial discharge current across the magnetic field takes place primarily via ion transport across the strong magnetic field because ions have much larger orbit than electrons. The force J×B causes ions to rotate in the azimuthal direction. At high densities frequent collisions between ions and neutrals make them rotate together. In our laboratory plasma a 0.1 ohm resistance and a radial current of 10 KA were observed for a voltage of 1 KV. This current gives rise to a force of 10,000 newtons in a field of 2T and a radius of 50 cm. Under this strong driving force Boron ions and neutrals can attain an energy of 100 KeV in 10 ms. This range of energy allows fusion to take place.

Boron atoms rotating at $3\times10^5$ revolutions/s at a radius of 50 cm will reach the energy of 100 KeV. Hydrogen-Boron fusion reaction can occur when high-pressure hydrogen gas is puffed in towards the rotating annular region of Boron. The high densities ($10^{18}$/cm$^3$) of neutral boron and hydrogen atoms help sustain a significant fusion yield even though the cross section is only $3\times10^{-28}$ cm$^2$.

In the rotating region where all the particles rotate at the same rate, assuming a solid body rotation there will be relative low velocity among elements for fusion. However the relative velocities between rotating Boron and ambient hydrogen atoms in the region surrounding the rotating region there will be high enough relative velocities for fusion to take place. A rate of reaction depends on the energy of $B^{11}$ and hydrogen. The device is operated at high neutral densities of hydrogen and boron as a result of instabilities due to space charges not being present. A high voltage is applied either in pulses or steady state or a combination of both pulses and steady voltages, with a resultant radial current flowing between the discharge rod 8 and the discharge rod 6, which function as electrodes. The radial current produces a strong torque to push ions in the azimuthal direction, causing collisions with neutrals and co-rotation of the neutrals with the ions. The power supply further produces a continuous chain of pulses, such that the radial current is sustained so as to produce a continuous driving force to rotate ion and neutrals. A combination of pulses and CW voltages are used to maximize the efficiency between rotating energy and the input electrical energy; pulses are used to sustain the number of ions in the system and CW voltages are used to maintain the rotation. The fusion reaction produces energetic alpha particles (He$^4$), which are used for direct conversion to electrical energy; and the slowing down of these alphas yields a charging current in a power supply.

If we take $n_p$, $n_b=10^{18}$/cm$^3$ and $\sigma=3\times10^{-28}$ cm$^2$ (assumed 100 KeV of energy for Boron) and relative speed between hydrogen and boron v=$10^8$ cm/s
we have dW/dt=$3\times10^{16}$/s cm$^3$×8.7 MeV=$5\times10^3$ J/s cm$^3$
Our proof-of-principle experiment lasts for 1 ms in a volume of $3\times10^3$ cm$^3$ the power released is estimated to be 15 KJ.

The energy input is 2.5 KV and 4000 A or 10 MW for 0.1 ms which is equal to 1 KJ.

If we can accelerate borons to 200 KeV the cross section is increased to $1.5\times10^{-26}$ cm$^2$ or 30 fold increase in cross section. If the energy input is doubled then the energy multiplication is estimated to be approximately 200.

Number Of He Nuclei To Be Detected.

The number of total reactions in 1 ms in a volume of $3\times10^3$ cm$^3$ is equal to $9\times10^{16}$. The product of reactions in He nuclei is $2.7\times10^{17}$.

The density of He particles is $0.9\times10^{14}$/cm$^3$ or $10^{-3}$ Ton/ms pulse. This density of He is detectable by a quadrupole mass spectrometer of RGA (residual gas analyzer). The population of He particles is increased with the number of pulses, when the volume is not pumped.

A method of estimating the maximum velocity of rotation of neutrals gained during the acceleration by J×B force or I L B where I is the radial current, L is the length of the current and B is the field perpendicular to I is as follows:

For our current pulsed experiments where helium is to be observed optically the following parameters are used: $I=10^4$ A, $L=0.5$ m, $B=3$ T $F=1.5\times10^4$ N.

Acceleration is $F/m=0.5\times10^9$ m/s$^2$, where m is the mass of borons and hydrogen at density of $10^{18}$/cm$^3$ and is equal to $3.3\times10^{-5}$ kg.

For 2 ms of acceleration $v=\frac{1}{2}$ a $t=10^6$ m/s. This justifies the assumption of $v=10^8$ cm/s assumed above in our calculation of fusion events. This velocity corresponds to Boron energy of 100 KeV.

For hydrogen-boron fusion the cross sections "sigma" are:
At 200 KeV sigma is $1.6\times10^{-2}$ Barn
At 100 KeV sigma is $3\times10^{-4}$ Barn
At 50 KeV sigma is $10^{-6}$ Barn
1 barn is $10^{-24}$ cm$^2$.
For DD reactions the fusion cross section is:
At 50 KeV sigma is $10^4$ barns
For DT reactions the fusion cross section is
At 10 KeV sigma is $10^5$ barns

What is claimed is:

1. A method of causing fusion between particles in a plasma and a target element, comprising:
   providing a superconducting magnet configured to generate an axial magnetic field;
   providing a cylindrical chamber located in said magnetic field;
   providing a target element in said cylindrical chamber;
   providing a discharge rod located in said cylindrical chamber;
   providing DC and pulsed electrical power to said discharge rod to develop an electric field perpendicular to said magnetic field;
   supplying hydrogen gas into said cylindrical chamber;
   creating a plasma of ions and neutrals from said hydrogen gas in said chamber by applying pulsed electrical power to said discharge rod; and
   causing said plasma to rotate within said cylindrical chamber by said electric and magnetic fields so as to cause a fusion reaction between particles in said plasma and said target element;
   wherein said target element comprises the element Lithium having a dominant isotope of Li$^6$.

2. The method of claim 1, further comprising producing energetic alpha particles (He$^4$) as a result of said fusion reaction; and
   converting energy of said energetic alpha particles to electrical energy.

3. The method of claim 1, further comprising producing energetic alpha particles (He$^4$) as a result of said fusion reaction; and
   yielding a charging current in a power supply by slowing down said alpha particles.

4. The method of claim 1, wherein the magnetic field produces a magnetic force J×B which drives the ions and neutrals to rotate together in the azimuthal direction in a cylindrical geometry in said cylindrical chamber.

5. The method of claim 1, wherein said plasma comprises higher neutral densities of hydrogen in the presence of reduced space charges in said plasma than neutral densities of hydrogen in the absence of reduced space charges.

6. The method of claim 1, wherein said plasma comprises higher neutral densities of hydrogen in the absence of excessive space charges in said plasma than neutral densities of hydrogen in the presence of excessive space charges.

7. The method of claim 1, wherein a rate of said reaction is a function of the energy of Li$^6$ and hydrogen.

* * * * *